United States Patent [19]

Moses et al.

[11] 4,425,661
[45] Jan. 10, 1984

[54] DATA UNDER VOICE COMMUNICATIONS SYSTEM

[75] Inventors: Donald W. Moses, Minneapolis, Minn.; Charles Hustig, Hudson, Wis.; C. Ray Ballard, Venice, Fla.

[73] Assignee: Applied Spectrum Technologies, Inc., Minneapolis, Minn.

[21] Appl. No.: 299,173

[22] Filed: Sep. 3, 1981

[51] Int. Cl.³ .......................... H04J 6/00; H04L 9/00
[52] U.S. Cl. ........................................ 375/1; 375/2.1; 370/19; 370/93; 370/110.4; 340/534
[58] Field of Search .................. 375/1, 5, 2.1, 2.2; 370/11, 19, 93, 110.1, 110.4; 328/14; 340/531, 534; 179/2 R, 2 DP, 84 R, 84 VF, 1.5 R, 1.5 M, 1.5 E; 455/26, 28, 29

[56] References Cited

U.S. PATENT DOCUMENTS

| | | | |
|---|---|---|---|
| 3,612,770 | 10/1971 | Zegers et al. | 370/110.4 |
| 3,824,468 | 7/1974 | Zegers et al. | 179/1.5 R |
| 3,845,391 | 10/1974 | Crosby | 455/45 |
| 4,231,113 | 10/1980 | Blasbalg | 455/29 |
| 4,234,874 | 11/1980 | Saya | 455/27 |
| 4,313,197 | 1/1982 | Maxemchuk | 370/23 |
| 4,328,554 | 5/1982 | Mantione | 328/14 |
| 4,328,579 | 5/1982 | Hashimoto et al. | 370/111 |

FOREIGN PATENT DOCUMENTS 2458964  1/1981  France .

OTHER PUBLICATIONS

National Telecommunications Conference, Wash., D. C., Nov. 1979, vol. 1, pp. 15.4.1–15.4.5.
National Telecommunications Conference, Houston, Tex., Dec. 1980, vol. 1 of 4, pp. 22.1.1–22.1.6.
International Symposium on Subscriber Loops and Services, Munich, Sep. 1980, vol. 73, pp. 217–223.

Primary Examiner—Benedict V. Safourek
Attorney, Agent, or Firm—Dorsey & Whitney

[57] ABSTRACT

A communications system capable of simultaneously transmitting voice and data information. The spectral energy of the data signal is smeared by spreading it in a spectrum with energy packed in the lower frequency range under the conventional voice signal frequency in a manner which complements the standard C-message weighting curve. The use of the spread spectrum technique also eliminates thumping at the data rate since the harmonics that produce thumping are also spread throughout the bandwidth.

40 Claims, 6 Drawing Figures

DATA UNDER VOICE COMMUNICATIONS SYSTEM

BACKGROUND OF THE INVENTION

The present invention generally relates to voice and data communications systems and more specifically relates to a system wherein both voice and data signals are communicated between a central office terminal and various subscriber terminals.

Telephone voice transmission uses the frequency spectrum of approximately 300–3000 hertz. Supervisory and data signals are sometimes sent "out of band," almost always above the voice band—very seldom below the voice band.

Data over voice systems have several advantages, e.g. high speed data capability, very little interference with voice transmission, and the like. However, long subscriber loops require load coils to provide adequate voice band transmission and these transmission devices limit the high frequency performance of rural subscriber loops making data over voice impossible.

Data under voice transmission has not been widely used in telephone systems, even though it is not limited by load coils and would work very well on long rural loops. The problem with recent data under voice systems was the voice band noise that is caused by harmonic distortion (and other distortion products) of the low frequency signal. Conventional data under voice systems suffered from these noise characteristics such as "thumping" at the data rate, low frequency modulation of the natural system noise components, and multiple harmonic components.

SUMMARY OF THE INVENTION

The disadvantages of the conventional data under voice systems can be significantly reduced by using a spread spectrum to suppress and spread the low frequency data signal's spectral energy. This spreading reduces interference from the signal's harmonic components and also smears the thumping noise characteristics and all other noise products.

In order to be effective the spreading code must be independent of the data being transmitted. Simply using more and more bandwidth to transmit a given data signal will not provide the noise suppression characteristic of the spread spectrum technique disclosed. The method of suppressing and spreading the data signal's spectral energy disclosed is to use a spread spectrum frequency hopping (FH) technique. In this technique one group of frequencies represents a mark, while another set of frequencies defines a space. A spreading code which is independent of the data being transmitted, controls the continuous hopping between frequencies at the chip rate. A six dB noise advantage is realized each time the number of frequencies used in each group is doubled. A subjective advantage greater than six dB is realized since the addition of the chip rate components to the data rate components breaks up the very obvious data rate thumping into many spectral products more closely resembling white noise and this resulting noise more effectively blends into the typical telephone noise channel background noise.

While the objective absolute value of the noise level is important, the subjective characteristic of "how the noise sounds" is the primary consideration. Spread spectrum techniques not only reduce the objectionable noise level—but also make the remaining noise much less noticeable. The preferred embodiment of the invention illustrates a method of generating a spread spectrum signal having two frequencies for a mark and two other frequencies for a space. This embodiment provides a six dB advantage over a two frequency FSK (Frequency Shift Keying) system plus the additional advantage of smearing the spectral components in order to provide a white noise characteristic. This produces a performance equal to conventional two-frequency FSK transmission conditions even though the interference characteristics of the spread spectrum system is much less than conventional FSK systems. In other words, the present invention provides a significant noise advantage without sacrificing performance.

DESCRIPTION OF THE PREFERRED EMBODIMENT

The preferred embodiment of the invention is suitable for use at any remote location having a telephone and can be used at that remote location to communicate data signals to a central office terminal without interfering with voice communications taking place on the telephone.

For purposes of illustration and to assist in understanding the operation of the invention, and not to limit the invention in any way, specific data transmissions are described in connection with the preferred embodiment. These data transmissions include activation of an intrusion alarm, a fire alarm, and similar data that might be transmitted from a remote location. It should be understood by those skilled in the art, however, that many and varied forms of data transmission can be achieved with the instant invention from a remote location without departing from the spirit and the intendment of the claims appended hereto.

Figure 1:
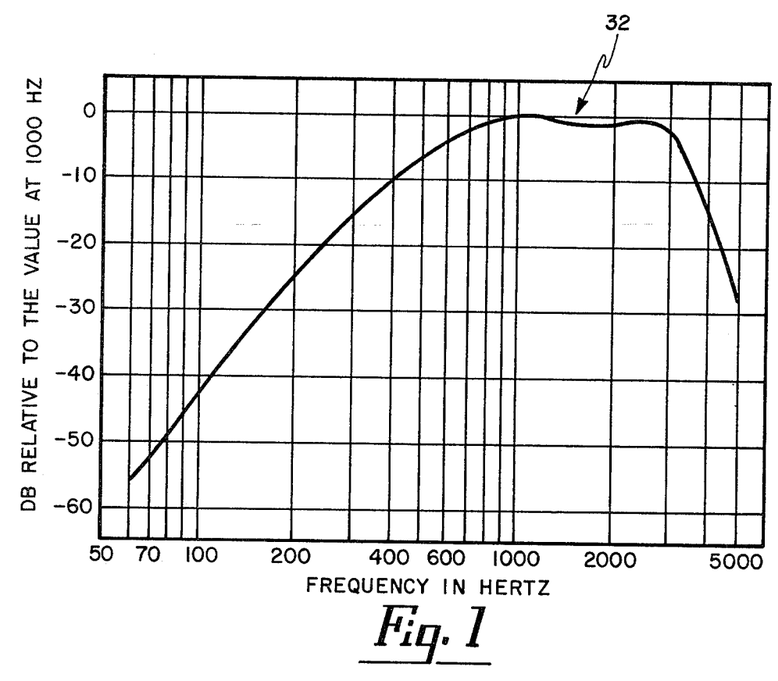
FIG. 1 is the standard C-message weighting curve showing the sound intensity required to produce an equivalent psychological reaction to a listener listening to a one thousand hertz tone.

FIG. 1 is the conventional C-message weighting curve, 32. As represented in FIG. 1, at representative frequencies of one hundred eighty hertz, three hundred sixty hertz and five hundred forty hertz, the reaction by a subscriber using a standard conventional type telephone set will be such that he hears these frequencies less loud by 27.5, 16.5 and 6 dB, respectively, than had the frequency been one thousand hertz and of the same magnitude. Stated in a different way, if the individual frequencies of one hundred eighty hertz, three hundred sixty hertz, and five hundred forty hertz were to produce the same stimulus (psychological reaction to the listener) as a one thousand hertz tone, they must be increased in level by 27.5, 16.5 and 6 dB respectively compared to the level of the one thousand hertz reference tone. This illustrates that different frequencies have different effects on hearing when using a conventional type telephone set. When applied to noise, this means that some harmonic frequencies have more interfering effect than others. Therefore, even a small amount of a particular harmonic could be sufficient to cause noisy conditions. The interfering effect of the different frequencies for equal loudness is the basis of any weighting curve which is used to measure over-all circuit noise.

It is for this reason that data under voice techniques of the past, using FSK systems, have produced undesirable thumping and over-all noisy transmissions even though the frequency shift occurs at the lower frequency range. Harmonics of the data rate in the thousand hertz range can be heard by the listener as the data rate or frequency changes.

Applicants' invention spreads the data transmission over the spectrum of the frequencies below voice. This suppresses the spectral energy at any one frequency and also smears the harmonics throughout the spectrum. Because the energy of the harmonics in the voice bandwidth, is also suppressed and spread throughout voice bandwidth, the noise level both in magnitude and in identifiable harmonic intensity produce a very low white noise characteristic rather than thumping produced by prior art systems.

Figure 2:
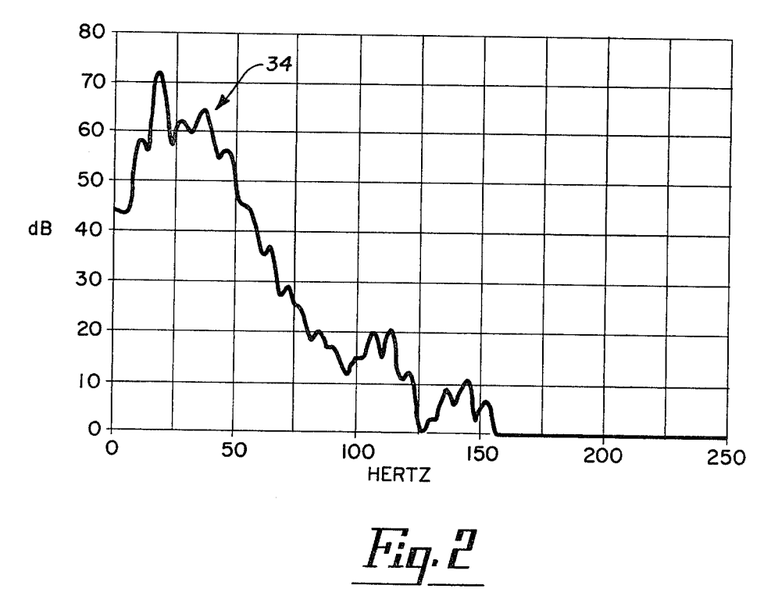
FIG. 2 is the curve of the spectral energy of data being transmitted using the preferred embodiment of Applicant's invention as shown in the remaining drawings.

FIG. 2 shows the curve 34 of energy distribution of the data at frequencies below the detectable voice transmission achieved with the preferred embodiment of the invention shown. As shown by a comparison of FIG. 2 and FIG. 1, the energy of transmission using Applicant's invention is packed in that portion of the C-message curve which has very low psychological impact on the listener. In this manner the message transmission is not heard by the listener nor do the harmonics interfere with voice transmission at the higher frequencies.

Referring now to FIG. 3, the means and method used to transmit data signals to the central office terminal under the voice communication signal using Applicants' spread spectrum technique is shown and can be understood.

Figure 3A:
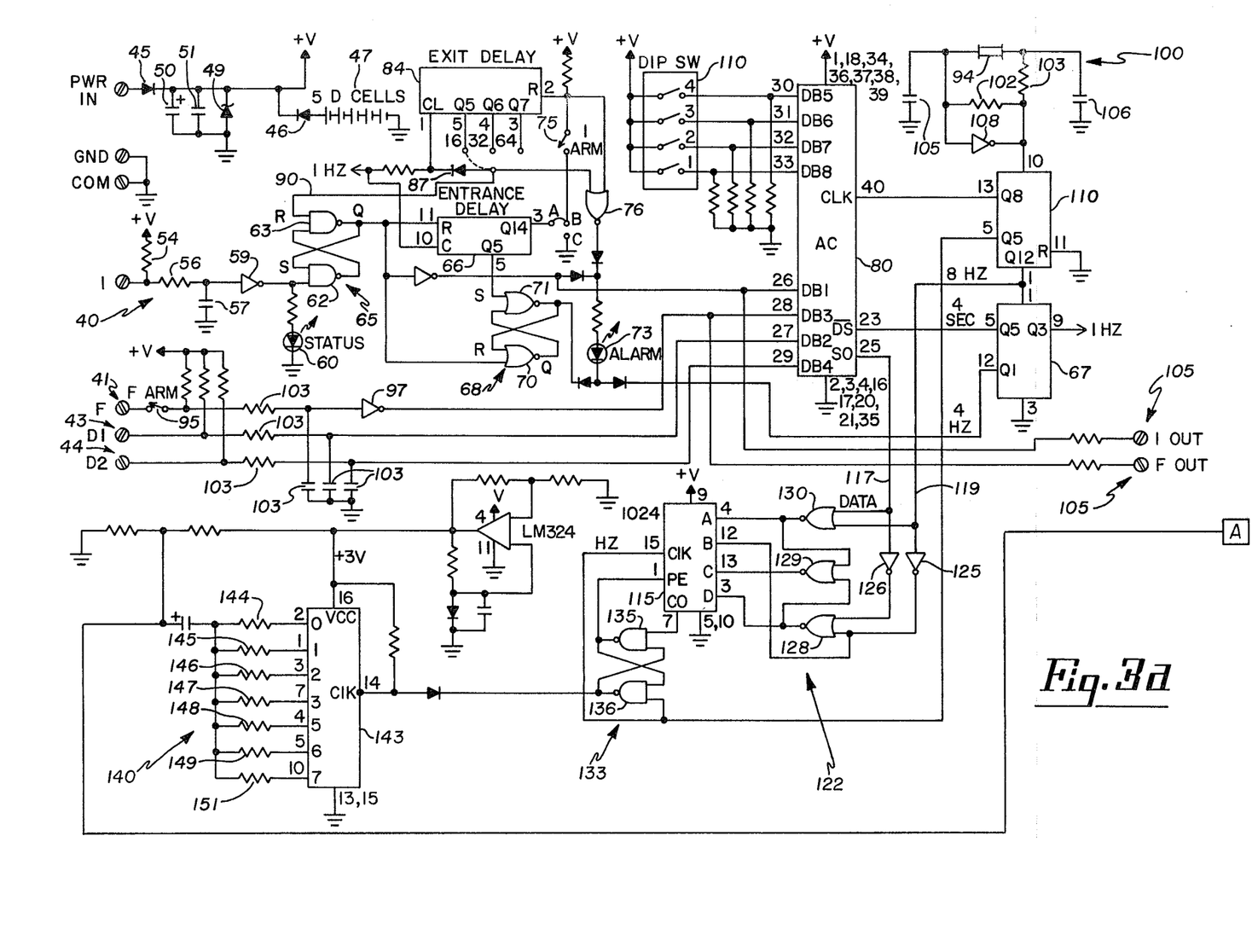
FIG. 3, consisting of FIGS. 3a and 3b, is a schematic diagram of a subscriber terminal employing Applicant's invention which is used to transmit data signals under the voice transmission.

Referring first to FIG. 3a, origination of the data signals under voice frequencies can be shown and understood.

The data information is transmitted in the conventional UART (Universal Asynchronous Receiver Transmitter) format having a start bit for framing, eight information bits, a parity bit and two stop bits. The eight data or information bits per frame in the preferred embodiment shown consist of four alarm or monitoring bits DB1-DB4 for a remote location and four address bits DB5-DB8 for security purposes.

In FIG. 3, the design for an intrusion alarm 40 and a fire alarm 41 are shown and two additional data terminals 43, 44 are shown which can be used for similar transmissions such as medical monitoring, meter readings, and the like.

Power for the transmitting unit is supplied by a power supply consisting of protection diodes 45, 46 with a battery back-up 47 consisting of five one and one half volt cells with Zener 49 protection and filtering 50, 51.

An instrusion alarm circuit 40 is provided which is one of the four alarm inputs. The intrusion detector (not shown), which can be any conventional detector such as an infrared detector, provides a normally closed contact to ground. A resistance 54 path to the power supply is provided as well as a current limiting resistor 56 and rise time limiting capacitor 57 to suppress AC line voltage coupling, lightning transients, and noise. An inverter 59 is used for isolation of the power supply and input to an alarm latch 65. An intrusion LED 60 is provided and normally energized when an intrusion is not being detected. Upon detection of an intrusion the normally closed intrusion contact opens, extinguishing the LED, and causing an intrusion signal to be generated which is latched by reset flip-flop 65 made up of two NAND gates 62, 63.

As soon as the intrusion is detected and the NAND gate 62, 63 reset flipflop 65 becomes latched, the output of the second NAND gate 63, which is connected to an entrance delay counter 66 on pin 11, causes the reset to go from logic "1" to logic "0" allowing it to start counting. The entrance delay counter 66 is clocked at one pulse per second from the Q3 output of a frequency divider 67, to be discussed below. It is strapped so that when it counts up to the preset entrance delay time, for example, sixteen seconds, the Q5 output goes high, latching a second latch 68 consisting of two NOR gates 70, 71. The reason for the second latch is to keep the entrance delay counter 66 counting so that when it reaches the count corresponding to the Q14 output, approximately two and a quarter hours, Q14 will go high and automatically reset the intrusion alarm circuit 40.

Therefore, if the sheriff or other security personnel arrives at a remote location and it appears that there has been no intrusion he does not have to enter the remote location which is being protected nor does he have to have access to or know how to disarm the system. The intrusion alarm 40 will automatically reset after roughly a two hour interval. He will still be able to check the intrusion status LED 60 which will indicate whether an intrusion is or is not being detected and the alarm LED 73 to determine the transmitted status of the alarm.

The entrance delay counter is so designed to enable an authorized person coming to the remote location where the system is installed to utilize the preset and programmed period of time to enter the remote location and have approximately sixteen seconds to find the arming switch 75 and switch it to the "off" position. When this occurs the circuit 40 is reset and the alarm transmission will be terminated before a time delay 340 in the central office terminal has time to indicate an alarm condition.

During the interval that the entrance delay counter 66 is counting the sixteen second disarming period the LED 73 will blink at a four hertz rate from the Q1 output of frequency divider 67. After the NOR gate latch 68 is latched, the alarm LED 73 will then be steady indicating that the intrusion alarm has been transmitted to and registered by the central office terminal indicating to the owner of the system that he ought to telephone the security officer and tell him what has transpired. The entrance delay latch 68 can be strapped to other output pins of the entrance delay counter 66 to give longer periods of time after entry in which to deenergize the alarm.

The output of the intrusion alarm is connected to one of the data channels, port DB1, input pin 26 of the UART 80.

An exit delay counter 84 is also provided so that the intrusion alarm 40 can be set by closing the arming switch 75 giving the person setting the alarm 40 sufficient time to depart the remote location or premises.

Upon closing the arming switch 75 the reset, pin 2, of the exit delay counter 84 is taken from logic 1 to logic 0 enabling it to count at the one hertz rate. A strappable option is provided by output ports Q5, Q6 or Q7, pins 3, 4 and 5 of the exit delay counter 84 to provide a sixteen second delay, thirty-two second delay, or sixty-four second delay. Depending upon the strap position, when the output signal goes high it is clocked into the exit delay counter 84 on pin 1 through diode 87 to prevent the exit delay counter 84 from counting any further and is further connected along line 90 to enable the input latch 65 so that if an intrusion input is received it will again be latched.

A second preferred alarm input is a fire alarm 41 such as a smoke detector (not shown). The circuit input includes a series arming switch 95 and the receiving circuit in the central office terminal includes a sixteen second time delay before the fire alarm 41 or other alarm is registered. Therefore, if a false alarm is detected because of kitchen smoke or from other causes the switch 41 can be opened and even though the smoke detector will continue to buzz, the fire alarm transmission will not be registered in the central office terminal. Since a fire alarm 41 is preferably an instant arming alarm there are no transmission time delays and the signal is connected directly to the UART 80, port DB3, pin 28 through inverter 97. Similarly, two additional data input connections 43, 44 are provided also connected directly to the input ports of the UART 80 on input ports DB2 and DB4 respectively, pins 27 and 29. Similar circuitry can be utilized for any of these data input signals to provide time delays in the manner recited in relation to the intrusion alarm 40. Protection circuitry 103 consisting of resistors and capacitors are also included in the event of lightning strikes, unintentional hook-up to or coupling of conventional power and for other noise immunity purposes.

The other two ports 43, 44 can be utilized advantageously for medical monitoring, meter reading, and the like. Similarly, represented in FIG. 3a are output circuits 105 which can be used to activate sirens, buzzers, or similar audible alarms at the remote location.

Additional data entry inputs preferably consist of a four bit address code from switches 110 into pins 30 through 33, input ports DB5 through DB8 of the UART 80. If a large number of subscribers are connected to the central office terminal, larger switches can be utilized or certain of the addresses can be randomly repeated. However, a specific address is preferably associated with each subscriber terminal to avoid the possibility that an intruder might attempt to splice the data output from a neighbor's cabin in an attempt to frustrate the alarm portion of the system or to connect a like system across the line and then cut the line in an attempt to fool the system. A false address will produce a loss of signal indication at the central office terminal causing alarms to sound as will be explained below in connection with the central office terminal.

To generate the frequencies necessary for spreading the spectrum of the data signals a clock crystal 94 is used in an oscillator circuit 100 including resistors 102, 103, capacitors 105, 106 and an inverter 108 to create a nominal thirty-two kilohertz signal. The clock frequency is connected to two dividers 110, 67 in series to divide down the clock frequency into frequencies utilized in the system.

The output of the first divider 110 on Q5 is a 1024 hertz signal which is used to clock programmable divider 115 which divides the 1024 hertz clock frequency by three, four, six or eight. Which number the programmable divider 115 will divide by depends upon the input data on line 117 and on the chip rate on line 119, an eight hertz signal obtained from output pin 1 of divider 110 which signal is also used to clock the second divider 67.

The output of the UART 80, in standard UART format having eight data bits, is combined with the eight hertz chip rate in a logic combining circuit 122 consisting of two inverters 125, 126 and three NOR gates 128–130 connected to programmable divider 115 to initiate the spread spectrum frequencies. The combining circuit 122 provides a BCD output as an input to the programmable divider 115.

The spreading criteria, simply stated, is that if the data output is logic 1, the chip rate can be either 1 or 0. Consequently, the output will bounce between two lower frequencies. If the data input is logic 0, the chip rate will cause the output to bounce between two higher frequencies. In the central office terminal, to be discussed below, a digital discriminator determines if the transmitted signal is above or below 25.6 hertz. If below, the logic level 0 is detected and generated; if above, a logic level 1 is detected and generated for purposes of processing by the central office terminal.

Depending on the BCD (Binary Coded Decimal) input to the programmable divider from the combining circuit 122 the 1024 hertz clock frequency is divided by three, four, six or eight. The frequency division will constantly change depending on the chip rate and the data rate. Consequently, the output from the CO port of the programmable divider 115, pin 7, comes at different rates in the clock rate divided by the programmed divisor. The output of the programmable divider is a short spike which is connected to a set-reset flip-flop 133 consisting of two NAND gates 135, 136 which is reset at the clock rate to provide a pulse signal of varying frequencies, the frequency depending on which of the sequential data signals is being transmitted, the logical status of the signal and the chip rate.

Since the output frequency is still at a higher frequency than that desired on the line, and to reduce discontinuities, the output is divided again by a staircase sine-wave generator 140 which consists of a shift register 143 having eight outputs each connected to one of a group of eight output resistors 144–151 having a sequential sinusoidal relationship one to the other. Thus, at any given time a voltage is applied across one of the output resistors, the other seven of which are tied to ground and the output signal moves to the next level upon receipt of the next pulse, which produces the pseudo sine-wave.

The output of the summing resistors therefore generates the sine-wave which randomly centers on the four operating frequencies which are continuously smeared. In other words, the frequency continually moves between the four primary frequencies instead of being at any one frequency for any length of time.

Figure 3B:
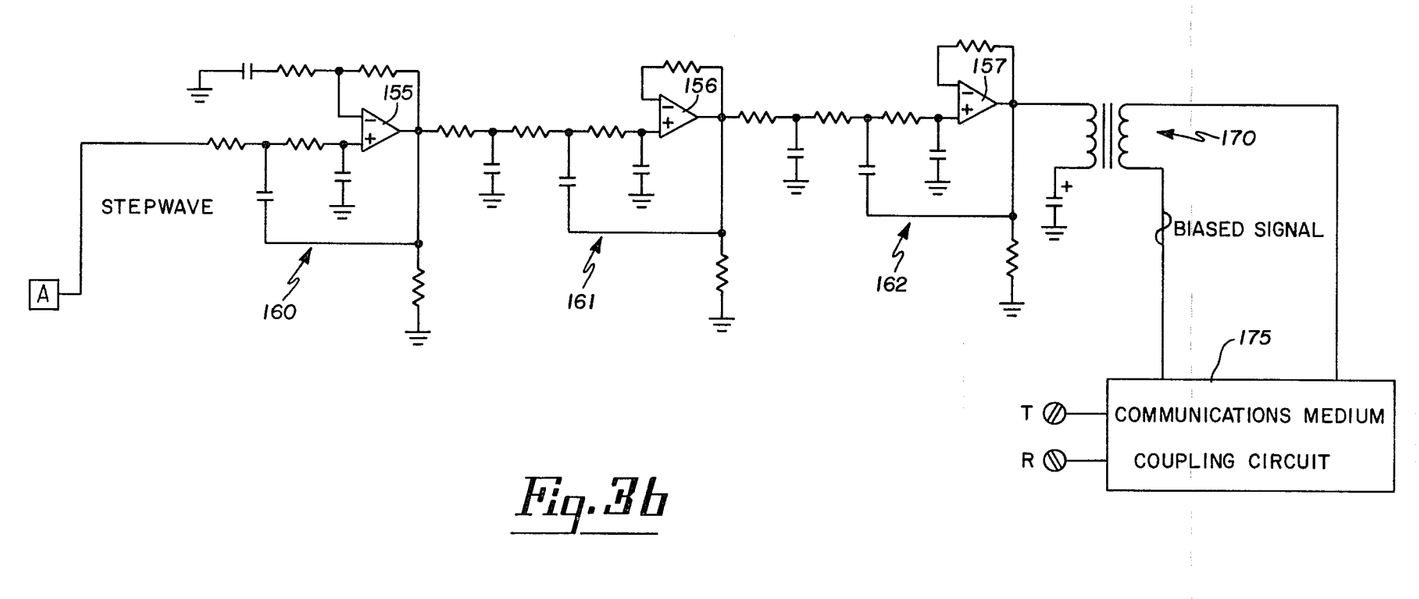

The output of the staircase sine-wave generator 140, as shown on FIG. 3b, is connected to a line driver consisting of three operational amplifiers 155–157 configured to be low pass filters 160–162 which smooth out the staircase sine-wave to get rid of the sharp edges, to get rid of any undesirable high frequencies and to eliminate the effect of the clock frequency on the output. The resulting output is a coherent FSK modulated signal where the modulation is a function of the data and the chip frequencies. This output is connected by a transformer 170 to a communications medium coupling or interface circuit 175 to put the data on the line to the central office terminal.

Figure 4B:
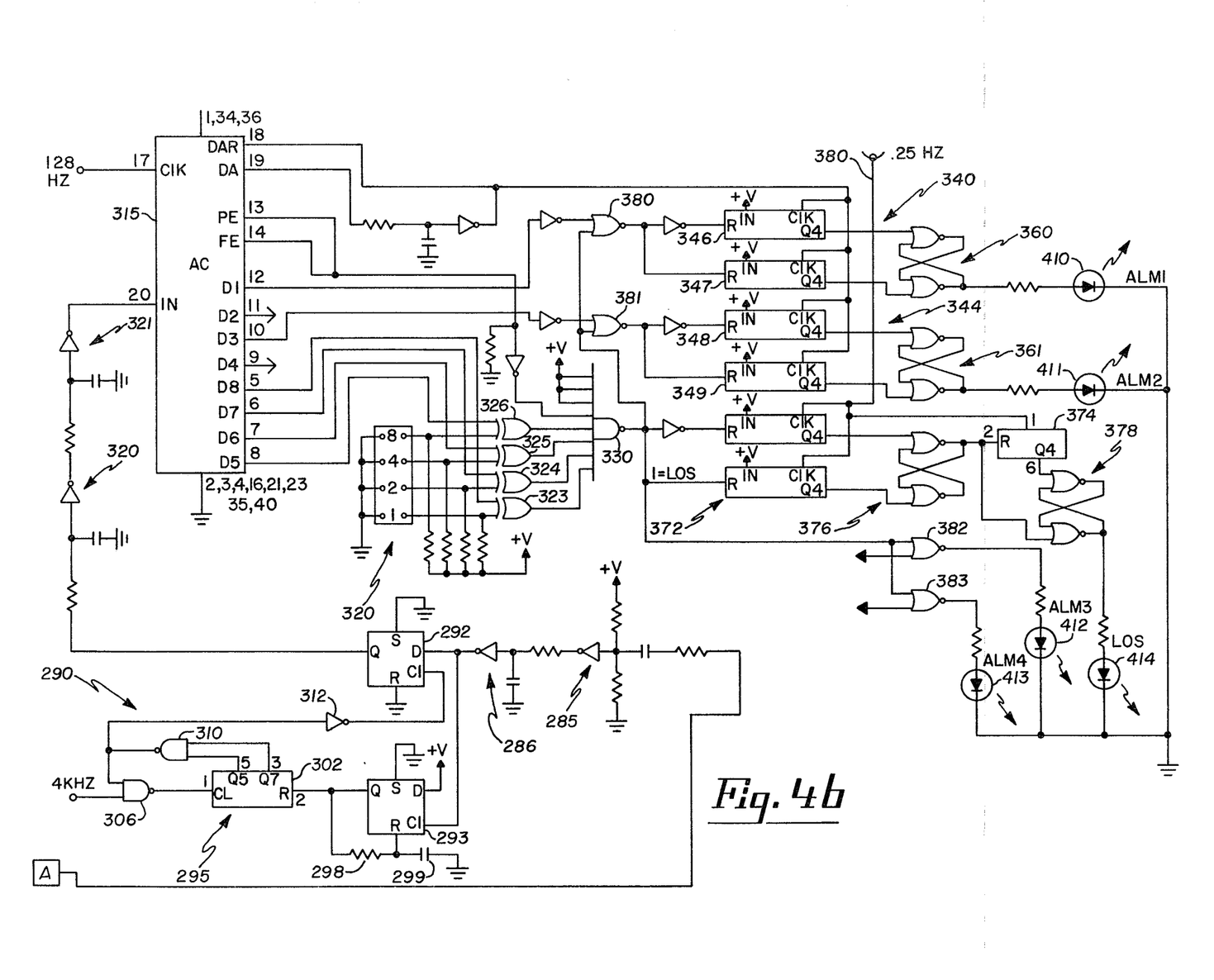
FIG. 4, consisting of FIGS. 4a and 4b, is a schematic diagram of a central office terminal to receive and decode the data transmitted by the terminal of FIG. 3.
Figure 4D:
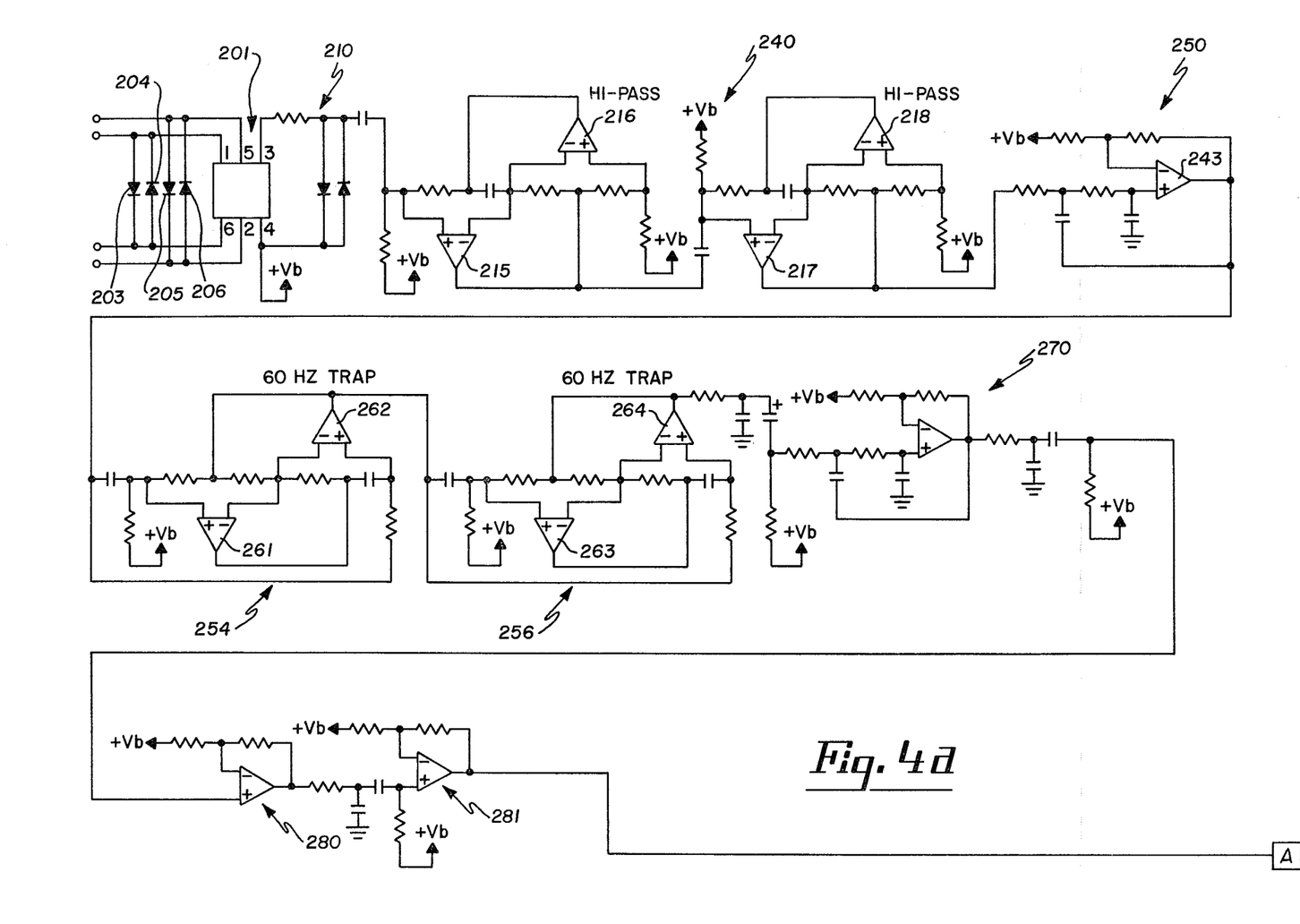

Referring now to FIG. 4, decoding of the data at the central office terminal can be shown and understood.

The central office terminal receiver is transformer 201 coupled to the telephone line with a line relay and a battery feed. Thus, the data input to the receiver terminal is a modulated current similar to that produced by the voice circuit or whatever else is on the line. Common mode rejection is accomplished by the transformer 201. Diodes 203–206 are provided to assure that noise such as lightning strike voltage surges bypass the transformer and to provide DC isolation between tip and ring.

Since the nominal resistance is on the order of four ohms, normal current flowing in the telephone does not generate enough DC voltage to turn to diodes 203–206 on but any large voltage spike will be bypassed by the diodes 203–206. Similarly, a protection circuit 210 on the secondary side of the transformer 201 is diode clamped to assure that the voltage into the circuit will not rise higher or lower than 0.7 volts.

The data signal is passed through four opamps 215–218 and associated circuitry which form a high pass network 240 having a cut-off frequency at about twelve hertz. The function of the high pass filter 240 is to eliminate very low frequency problems caused by moving the handset and the like which puts an error signal below ten hertz onto the line, the output of the high pass filter 240 is connected to another opamp 243 and associated circuitry connected to create a low pass filter 250 to reject the voice information that may be on the line, the low pass filter 250 is followed by two series connected sixty hertz trap circuits 254, 256 consisting of opamps 261–264 and associated circuitry to get rid of the strong sixty hertz noise. The sixty hertz trap circuits 254, 256 are followed by another low pass filter 270 for voice rejection to clean up the data signal. Two amplifiers 280, 281 are then utilized each with a voltage gain of twenty to provide a total voltage gain of four hundred. The data signal at this point has the appearance of a jagged-looking sine wave.

This signal is connected to two Schmitt trigger type CMOS gates 285, 286 to provide as clean an input as possible to a digital discriminator 290 used to decode the data.

The digital discriminator 290 consists of two interconnected flip-flops 292, 293 between which are interposed a counting circuit 295 including logic elements. The input to the discriminator is the square-wave generated by the prior circuitry. The square-wave is connected to both flip-flops 292, 293. The first flip-flop 292 will pass the signal through for low frequencies, but will not pass the higher frequency signals, resulting in a logic 1 for received frequencies below 25.6 hertz and logic 0 for frequencies above 25.6 hertz, thus reconstructing the mark and space, or data, that was transmitted by the transmitter shown in FIG. 3. The input square-wave is also connected to the clock input of the second flip-flop 293 which clocks a logic 1 into the output on the positive transition of the square-wave input. The output also is fed back to the reset of the flip-flop 293 with a resistor-capacitor 298–299 time delay so that the flip-flop gives a pulse for every positive transition.

The pulse output resets a counter 302. The counter 302 is constantly counting the four kilohertz input which is connected through a NAND gate 306 to the clock input, pin 1. Two outputs from the counter from output ports Q5 and Q7, pins 5 and 3, determine whether or not the count which corresponds to 25.6 hertz has or has not been reached. If the count reaches that corresponding to 25.6 hertz the NAND gate 310 output, through an inverter 312, will go high and the positive transition will clock the signal through the first flip-flop 292 giving a logic 1 output at the Q output of the flip-flop 292 indicating that a mark or high signal had been transmitted by the subscriber terminal. If a second positive transition occurs in the input square wave before the count reaches 25.6 hertz it will clock the second flip-flop 293 resetting the counter 302 and thus the output of the first flip-flop 292 will remain low indicating that a higher frequency is being received therefore again reconstructing the data input to the transmitter. The output of the flip-flop 292 is connected in the input UART 315 through two Schmitt trigger circuits, 320, 321, again with resistive capacitor time constants to assure a clean input to the UART 315.

Consequently, at the input to the UART 315 the chip rate information has been eliminated and the input is the initial data information which was transmitted by the transmitter. The signal is connected to the receive function of the UART 315 which makes a parity check, a framing check and connects the framed output information on channels one through eight, ports DB1–DB8, pins 5–12 each of which corresponds to the input signals to the transmitter. Channels one through four correspond to alarm inputs one through four and channels five through eight carry the address code which is matched with the address code that is switched in with switch 320 at the receiver.

To assure that the address is correct exclusive OR gates 323–326 are provided and if the address code matches, the output of each of the OR gates 323–326 will be logic 1, and if no parity error or framing error is detected by the UART 315 a fifth input to a multiple input NAND gate 330 is logic 1. The output of the NAND gate 330 is connected to enable time delay circuits for purposes of the intrusion alarm, the fire alarm and to NOR gates for the other data transmitted. It is also connected directly to a loss of signal counter which is activated in the event of loss of a data signal, parity error, framing error, or a wrong address.

It should be understood by those learned in the art that if monitoring functions similar to fire or intrusion or the like, that time delays can be added to the remaining two data ports and if more immediate indication is desired for the first two data inputs, the time delay circuitry 340, 344 can be eliminated and direct readout can be achieved in the same manner as demonstrated for data ports 3 and 4.

The data available signal from output pin 19 of the UART 315 is used to clock each of four data digital time delay counters 346–349. The inverted signal is fed back into pin 18 of the UART 315 to reset the data available port. The intrusion signal and the fire alarm signal are each connected to a four stage counter 346, 347 and 348, 349, respectively, that is clocked with each frame that comes in by the data available framing pulse received designated latch RCV signal. Consequently, four frames of data indicating an intrusion alarm or a fire alarm is necessary before the Q4 outputs of the four stage counters 340, 344 will go high and be latched by NOR gate latching circuits 360, 361. Once latched, the alarm will remain until four frames are received indicating that the alarm is no longer activated. The four frame delay is to assure that a noise burst or a momentary loss of signal does not change the output. It also provides the entrance delay time of sixteen seconds to disarm the alarms. Each output, including the loss of signal output and the other two data outputs, can be conveniently connected to LED indicators 410-414 to visually indicate the time loss of signal, activation of alarms as well as to buzzers, sirens, or other audible indication.

Preferably the loss of signal alarm time delay is longer than the time delay associated with any individual signal in that certain situations occur which might cause a loss of signal for periods of time greater than the sixteen seconds associated with the other data inputs, such as, ringing of the phone and other intermittent causes. Accordingly, a sixty-four second time delay can be conveniently provided with the use of two stages of counters 372, 374 and associated latches 376, 378 with each counter 372, 374.

Since loss of signal will prevent data received clocking pulses, the loss of signal circuit is clocked at 0.25 hertz along line 380 through the four stages to give the sixty-four second total time for detection and visual or audible indiation of loss of signal. The output of the NAND gate 330 indicating an invalid address or loss of signal is also connected through NOR gates 380-383 to each of the alarm circuits to clamp them to zero to avoid decoding nonsense information.

The foregoing specifications sets forth certain preferred embodiments and modifications of the invention and some of the ways in which the invention may be put into practice, including the best mode presently contemplated by the inventors for carrying out their invention. Modification of the described embodiment, as well as alternate embodiments and devices for carrying out the invention, will also be apparent to those skilled in the art. All such variations and modifications are intended to be within the spirit and scope of the following claims:

We claim:

1. A communications system for communicating data information simultaneously with voice transmission at frequencies less than the voice transmission comprising:
    means for generating at least one digital data signal;
    means for generating at least one spreading frequency;
    means for combining the data signal and the spreading frequency to create a spreading code for transmission of the data which causes the data to be transmitted at three or more fundamental frequencies; and
    means for transmitting the fundamental frequencies simultaneously with the voice transmission, the data being transmitted as a coherent frequency modulated signal having a constantly varying fundamental frequency less than the voice frequency bandwidth.

2. The communications system of claim 1 wherein the means for combining the data signals and the spreading frequency comprise means for smearing or spreading the fundamental frequencies so that harmonics of the fundamental frequencies are suppressed and to the extent they occur in the voice band are spread throughout the voice bandwidth.

3. The communications system of claim 1 wherein the means for combining the data signal and the spreading frequency comprises means for causing the data to be transmitted at many varying fundamental frequencies, all less than the voice frequency bandwidth, so that the spectral energy of the frequency modulated signal is packed in that area of the frequency spectrum having low psychological impact on a listener.

4. The communication system of claim 1 further comprising means for generating a plurality of digital data signals and wherein the means for combining the data signal and the spreading frequency comprises means for combining the plurality of data signals and the spreading frequencies so that all data is transmitted by the transmitting means as a coherent frequency modulated signal having a constantly varying fundamental frequency less than the voice frequency bandwidth.

5. The communications system of claim 4 wherein the means for generating a plurality of digital data signals comprises means for sequentially generating the data in frames of information.

6. The communications system of claim 5 wherein the means for generating the plurality of digital data signals comprises means for generating eight digital data signals.

7. The communications system of claim 6 wherein the means for generating eight digital signals comprises means for generating four digital data signals comprising monitoring information and four digital data signals comprising an address code for the specific communications system transmitter generating the signals.

8. The communications system of claim 7 wherein the means for generating signals comprises means for generating at least two digital data signals for monitoring and transmitting meter readings, medical monitoring equipment information and the like.

9. The communications system of claim 7 wherein the means for generating monitoring signals comprises means for generating at least two alarm signals.

10. The communications system of claim 9 wherein the means for generating alarm signals comprises means for generating a fire alarm.

11. The communications system of claim 9 wherein the means for generating alarm signals comprises means for generating an intrusion alarm.

12. The communications system of claim 1 wherein the means for combining the data signal and the spreading frequency comprises:
    a combining circuit having at least two inputs, one input connected to the digital data signal and the other input connected to the spreading frequency signal, the combining circuit combining the inputs to generate at least three varying binary outputs; and
    a frequency divider connected to the outputs of the combining circuit and connected to a clock frequency so that the output of the frequency divider is a function of the clock frequency divided by the binary outputs of the combining circuit.

13. The communications system of claim 12 wherein the means for combining the data signal and the spreading frequency further comprise a means for generating fundamental frequencies less than the voice frequency bandwidth.

14. The communications system of claim 13 wherein the means for generating fundamental frequencies less than the voice frequency bandwidth comprises a staircase sine-wave generator.

15. The communications system of claim 14 wherein the staircase sine-wave generator comprises a shift register having a plurality of outputs connected to the output of the frequency divider and wherein a plurality of resistors having a sinusoidal relationship are connected to the outputs of the shift register which is clocked by the frequency divider so that the output of the staircase sine-wave generator is a sinusoidally varying output wave form having a varying fundamental frequency which is a function of the frequencies generated by the combining circuit and the frequency divider and the number of outputs of the shift register.

16. The communications system of claim 1 wherein the means for transmitting the fundamental frequencies comprises a low pass filter and a coupling circuit for transmission of the signal to a central office terminal.

17. The communications system of claim 1 further comprising:
means for receiving the frequency modulated signal;
means for decoding the received frequency modulated signal; and
means for generating from the decoded received frequency modulated signal a received digital data signal which corresponds to the digital data signal originally generated.

18. The communications system of claim 17 wherein the means for receiving the frequency modulated signal comprises a high pass filter circuit having a cut-off frequency at about twelve hertz for eliminating very low frequency interference.

19. The communications system of claim 17 wherein the means for receiving the frequency modulated signal comprises a low pass filter circuit for rejecting voice information on the line.

20. The communications system of claim 17 wherein the means for receiving the frequency modulated signal comprises a sixty hertz trap circuit for eliminating sixty cycle noise.

21. The communications system of claim 17 wherein the means for decoding the frequency modulated signal comprises a means for discriminating between frequencies above and below a preselected frequency which is a function of the fundamental frequencies at which the coherent frequency modulated signal is transmitted.

22. The communications system of claim 21 wherein the means for discriminating between transmitted frequencies comprises a digital discriminator having an output which is at a first logic level for frequencies below the preselected frequency and at a second logic level for frequencies above the preselected frequency.

23. The communications system of claim 17 wherein the means for generating the received digital data signal comprises a means for detecting loss of signal.

24. The communications system of claim 17 wherein the digital signal transmitted comprises an address code which is transmitted to the receiving means and wherein the communications system further comprises:
means for generating a second address code at the central office terminal; and
means for comparing the second address code generated with the address code transmitted by the subscriber terminal.

25. The communications system of claim 17 wherein at least one digital alarm signal is transmitted and wherein the means for generating the received digital data signal comprises time delay registration of the alarm for a preselected period of time to enable disarming of the alarm during the preselected time period so that a false alarm is not registered.

26. The communications system of claim 17 wherein at least one digital alarm signal is transmitted and further comprising indicating means for visually indicating the alarm transmitted by the transmitting means.

27. A method for communicating data information over a communications medium at frequencies less than voice transmission frequencies comprising:
generating at least one digital data signal;
generating at least one spreading frequency;
combining the data signal and spreading frequency to create a spreading code for transmission of the data which causes the data to be transmitted at three or more fundamental frequencies; and
transmitting the fundamental frequencies as a coherent frequency modulated signal having a constantly varying fundamental frequency less than the voice frequency bandwidth.

28. The method of claim 27 further comprising the steps of suppressing the harmonics of the fundamental frequencies and spreading them throughout the voice bandwidth.

29. The method of claim 27 wherein the step of generating at least one digital data signal comprises the steps of generating a plurality of digital data signals and sequentially transmitting them in frames of information.

30. The method of claim 29 wherein the step of generating a plurality of digital data signals comprises the step of generating an address code for the specific communications system transmitter generating the signals.

31. The method of claim 27 wherein the step of generating at least one digital data signal comprises the step of generating at least one alarm signal.

32. The method of claim 27 wherein the step of generating at least one digital data signal comprises the step of generating at least one monitoring signal.

33. The method of claim 27 wherein the step of combining the data signal and the spreading frequency comprises the steps of:
generating at least three varying binary signals which are a function of the digital data signal and the spreading frequency; and
dividing a clock frequency by the varying binary signals.

34. The method of claim 33 wherein the step of combining the data signal and the spreading frequency comprises generating a coherent frequency modulated signal having a constantly varying fundamental frequency less than the voice frequency bandwidth which is a function of the varying binary signal and the clock frequency.

35. The method of claim 27 wherein comprising:
receiving the frequency modulated signal;
decoding the received frequency modulated signal; and
generating from the decoded received frequency modulated signal a received digital data signal which corresponds to the digital data signal originally generated.

36. The method of claim 35 wherein the step of receiving the frequency modulated signal comprises the step of filtering the frequency modulated signal to eliminate low frequency interference.

37. The method of claim 35 wherein the step of receiving the frequency modulated signal comprises the step of filtering the frequency modulated signal to eliminate voice frequency signals.

38. The method of claim 35 wherein the step of receiving the frequency modulated signal comprises the step of filtering the frequency modulated signal to eliminate sixty cycle noise.

39. The method of claim 35 wherein the step of decoding the frequency modulated signal comprises the step of discriminating between frequencies above and below a preselected frequency which is a function of the fundamental frequencies at which the coherent frequency modulated signal was transmitted.

40. The method of claim 35 wherein the method further comprises the steps of:
registering the received digital data signal to indicate the data signal transmitted; and
delaying registration of the signal for a preselected period of time to allow disarming of the signal prior to registration.

* * * * *

UNITED STATES PATENT AND TRADEMARK OFFICE
CERTIFICATE OF CORRECTION

PATENT NO. : 4,425,661
DATED : January 10, 1984
INVENTOR(S) : Donald W. Moses et al.

It is certified that error appears in the above-identified patent and that said Letters Patent is hereby corrected as shown below:

In Column 11, line 65, after "delay" and before "registration" insert --means for delaying--.

In Column 12, line 51, delete "wherein" and insert --further--.

Signed and Sealed this

Twenty-third Day of October 1984

[SEAL]

Attest:

GERALD J. MOSSINGHOFF

Attesting Officer     Commissioner of Patents and Trademarks